No. 846,279. PATENTED MAR. 5, 1907.
H. BANNON.
MOLDING MACHINE.
APPLICATION FILED JULY 6, 1905.
3 SHEETS—SHEET 2.
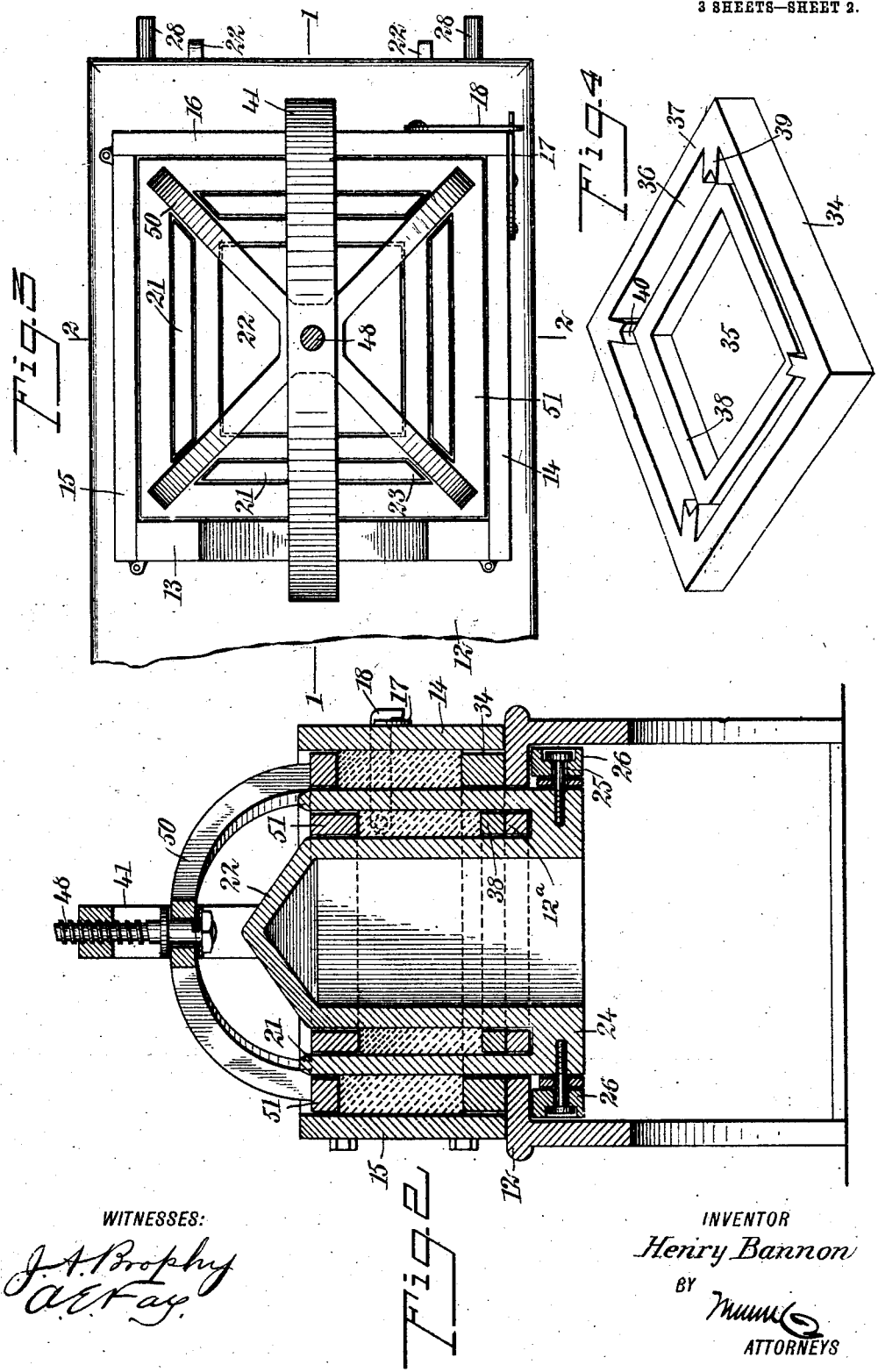
WITNESSES:
J. A. Brophy
A. E. Fay
INVENTOR
Henry Bannon
BY
ATTORNEYS No. 846,279.   
PATENTED MAR. 5, 1907.

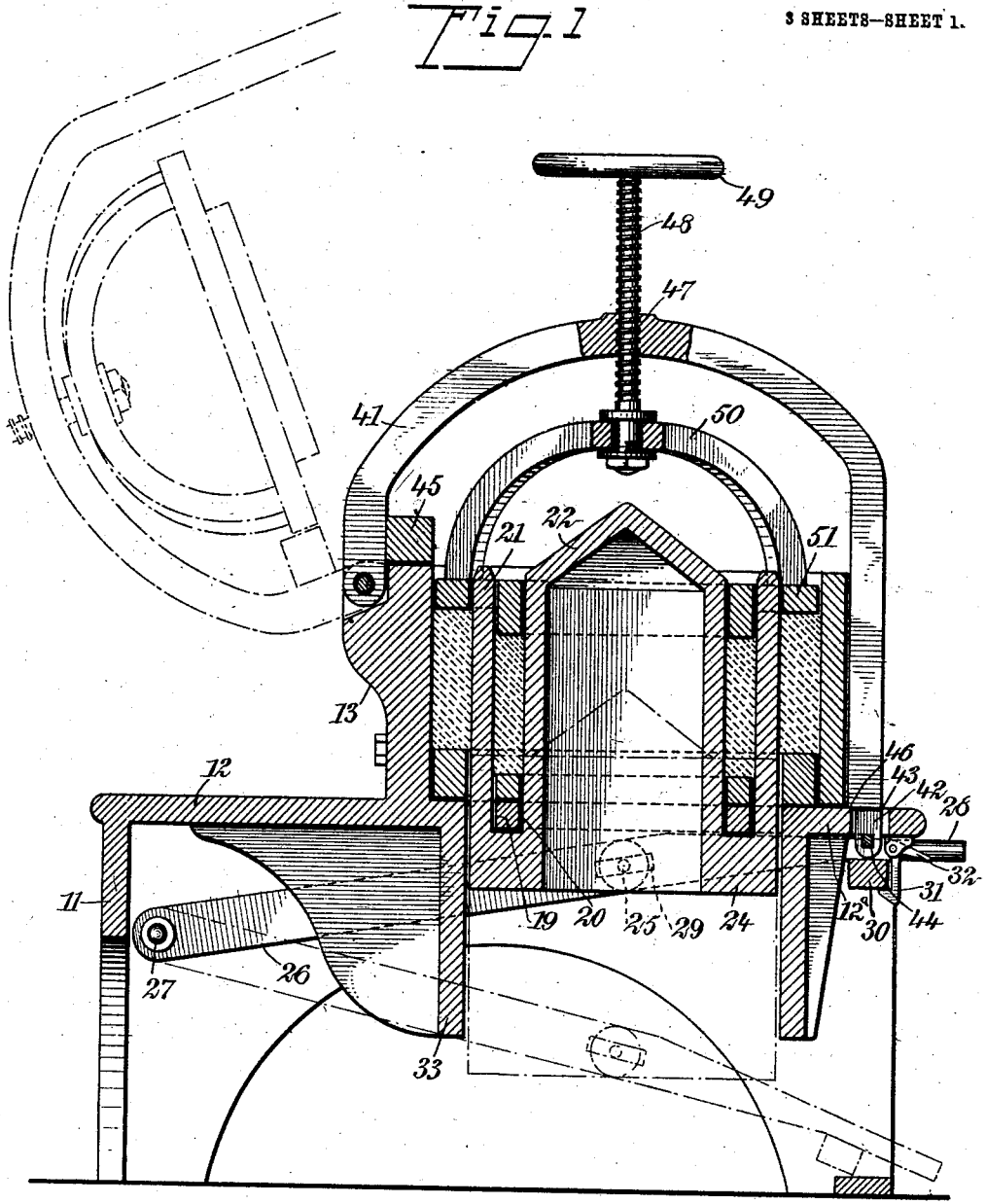

H. BANNON.
MOLDING MACHINE.
APPLICATION FILED JULY 6, 1905.

3 SHEETS—SHEET 3.

WITNESSES:
J. H. Brophy
A. E. Fay

INVENTOR
Henry Bannon
BY Munn
ATTORNEYS

UNITED STATES PATENT OFFICE.

HENRY BANNON, OF ELWOOD, INDIANA.

MOLDING-MACHINE.

No. 846,279. Specification of Letters Patent. Patented March 5, 1907.

Application filed July 6, 1905. Serial No. 268,373.

*To all whom it may concern:*

Be it known that I, HENRY BANNON, a citizen of the United States, and a resident of Elwood, in the county of Madison and State of Indiana, have invented a new and Improved Molding-Machine, of which the following is a full, clear, and exact description.

My invention relates to machines for molding plastic materials, and while capable of general use is especially adapted for molding chimney-blocks having smoke and ventilating passages.

The principal objects of the invention are to provide a hand-press for this purpose which can be made throughout of cast-steel, so as to provide for great strength without making the parts large and clumsy, and which can be easily and effectively operated by an attendant to mold articles of somewhat complicated shape and leave them in such a condition that they can be readily removed from the mold and set aside for drying; also, to provide an efficient and easily-operable core-manipulating device, a simple means for opening the mold, a novel press-head, and a pallet.

Further objects of the invention will appear in the course of the subjoined description.

Reference is to be had to the accompanying drawings, forming a part of this specification, in which similar characters of reference indicate corresponding parts in all the figures.

Figure 5:
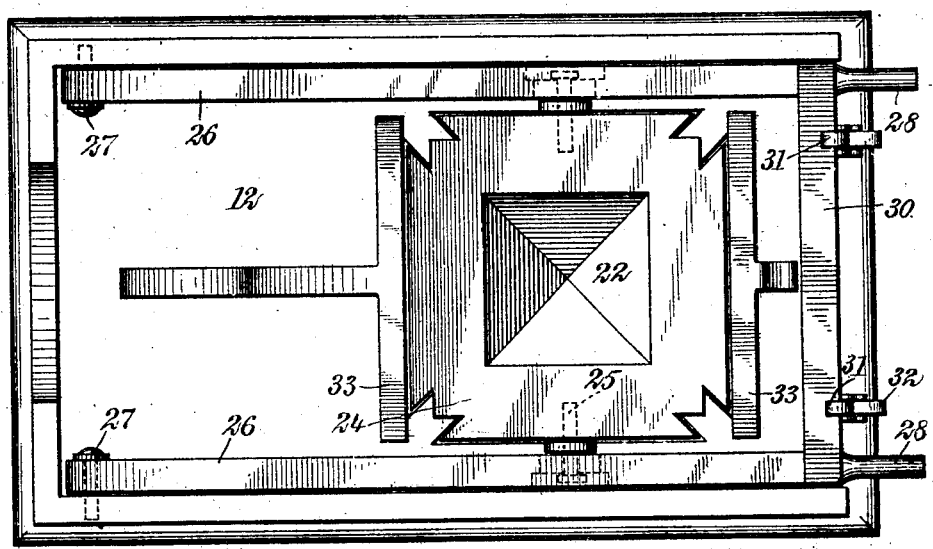

Figure 1 is a longitudinal central sectional view of a molding-machine constructed in accordance with the principle of my invention. Fig. 2 is a transverse sectional view of the same. Fig. 3 is a plan of a portion of the machine. Fig. 4 is a perspective view of a pallet which constitutes a portion of my invention. Fig. 5 is a bottom plan view, and Fig. 6 is a perspective view showing a chimney-block which can be made on this machine with another one above it and about to be placed upon it.

Figure 6:
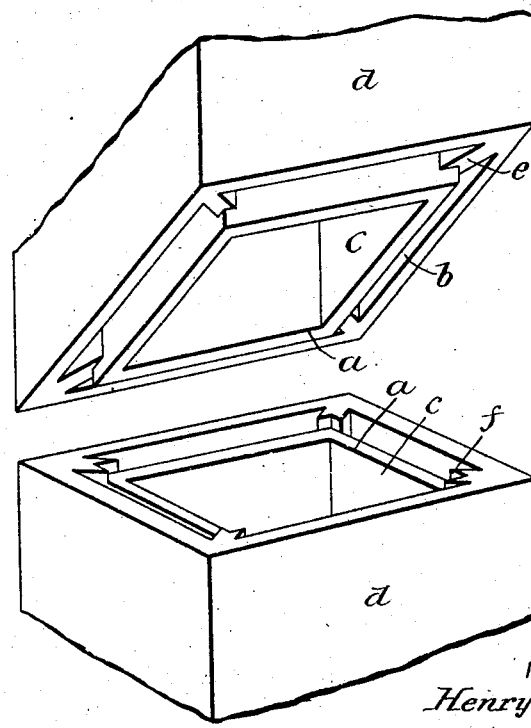

Referring first to Fig. 6, attention is called to the two blocks shown, which illustrate the top and bottom surfaces of one of the articles that can be molded upon my improved machine. These blocks are provided with a central square smoke-passage $a$ and with four ventilating-passages $b$ on the four sides of the smoke-passage. The latter passages are separated from the central one by inner walls $c$, and outside the ventilating-passages are outer walls $d$. The top of each block is depressed in the center—that is, the walls $c$ are lower than the walls $d$, and the latter are provided with inwardly-extending projections $e$, which unite the two walls with each other. The outer walls are provided with square notches $f$ in their inner faces, which correspond with the planes of the outer surfaces of the inner walls. The lower surface of each block is constructed in a similar manner, but reversely—that is, the inner wall projects beyond the outer wall sufficiently to fit the top of another block, and this explains why the notches $f$ are provided, as they have to fit the corners of the inner walls. The machine which I have illustrated is shown as provided with a mold formed for making a block such as that described.

The machine has a base 11, provided with a table 12. This table supports a standard 13, which is preferably fixed in stationary position and extends across the table so as to constitute the rear wall of a mold and in my preferred form is the only stationary wall the mold has, except the bottom, which is formed by the table itself, as indicated by the numeral 12$^a$. Hinged to the two opposite ends of the standard and mold-wall 13 are two side plates 14 and 15, and to the latter is a front plate 16. These four walls 13, 14, 15, and 16 may be formed in any desired shape, and, in fact, the number of walls is immaterial, but they are all mounted above the table 12 and above the bottom of the mold, so that when secured together in any proper relation to each other they constitute the main portion of a separable mold. They are preferably capable of being secured together at one corner by means of a catch 17 and hook 18, mounted on two of the walls. It will be observed that the mold can be opened by swinging the wall 14 in one direction and the walls 15 and 16 in the other, thus leaving the molded article free to be removed from the machine.

The bottom 12$^a$ of the mold is preferably flat and provided with perforations 19 and 20 for cores 21 and 22. In the form illustrated there are four cores 21, which are provided for the purpose of making ventilating-passages in the block to be molded, and a central core 22, provided for making the smoke-passage in the block. These cores are made in any desired form, according to the shape of the article to be molded, but the central one is illustrated as being square, with a top in the form of a pyramid, and the ventilating-cores are shown in the form of flat plates having beveled edges 23 adjacent to each other for the purpose of leaving a space in which the plastic material can be molded to form the corners of the block to be produced. These cores are preferably connected together at the bottom by means of a plate 24. This plate is provided with studs 25, by means of which it is pivotally connected with a pair of levers 26, which are in turn pivoted on studs 27 at the back part of the machine and are provided with handles 28, projecting from the front edge of the machine. A slot 29 is preferably provided in each lever for receiving the stud 25 and allowing play. The levers are connected by a cross-bar 30 near the front of the machine, which is designed to be locked in elevated position by means of hooks 31, pivoted on the under side of the table 12 and normally held in locking position by means of springs. (Not shown.) These hooks are provided with projections 32, which serve as handles for operating them to quickly disengage them from the bar 30, so as to permit the same to drop and draw the cores through the bottom of the mold, which acts as a stripping-plate for them. The under side of the table is provided with flanges 33 for guiding the core-plate and cores and causing them to move in a straight line.

On the bottom of the mold a pallet 34 is designed to rest. The pallet is provided with a central opening 35 and side openings 36 for receiving the cores, and when it rests on the bottom of the mold in the ordinary manner it assumes the function of a stripping-plate instead of the bottom of the mold itself. It also supports the molded article while the cores are being withdrawn, so that it can be removed from the mold on the pallet and left to dry. Each machine is supplied with a number of pallets. In the form shown the pallet is provided with a projecting upper edge 37, surrounding the cores 21, and with an inner ledge 38, located between the inner core and the outer cores. Connecting these two parts is a projection 39 at each corner. Each of these projections is provided with a square recess 40, corresponding with the corner of the ledge 38. The upper surface of the pallet corresponds in every way with the bottom surface of the article to be molded, and the form will be changed according to the form of the article.

Pivotally mounted upon the standard 13 is a frame 41, which is preferably capable of extending over the top of the mold and is provided with a projection 42, which is adapted to extend through a perforation 43 in the front of the table and through which passes a pin 44 for securing the frame in the position shown in full lines in Fig. 1. The frame is preferably provided with a projection 45, which is rigidly secured to it and is adapted to rest upon the top of the standard 13 when the frame is in operative position. This assists in supporting the frame, and a square shoulder 46 also assists in supporting it. The frame is provided with a screw-threaded opening 47 in its upper part, and through this passes a screw 48, having a hand-wheel 49 and pivotally connected with a press-plate frame 50. This latter frame carries a press-plate 51, which is made in a shape corresponding mainly with the shape of the pallet, but being a negative thereof, whereby the opposite ends of the block produced will have the relation to each other of positive and negative, respectively. This is provided so that two blocks can be fitted together, the projections of one entering the indentations of another.

In operating the device the pallet is first placed in the mold, the core-plate elevated and locked in position by the hooks 31, which is accomplished automatically. The mold sides are then brought together and secured in closed position by means of the lock 17 18. Then the mold material is introduced and, if necessary, given a preliminary tamping, so that it can be accurately and evenly spread in all parts of the mold. When sufficient mold material has been introduced, the frame 41 is brought into the position shown in full lines in Fig. 1 and the hand-wheel 48 turned so as to impart pressure to the molding material through the plate 51. In order to remove the molded block, the pin 44 is loosened, the plate 51 raised so as to clear the top of the mold or cores, and the frame 41 turned back to the position shown in dotted lines in Fig. 1. Simultaneously with this operation, if desired, the handles 32 may be operated to release the cores and let them drop. Then the mold-walls are separated from each other and the molded article removed on the pallet. Another pallet is then introduced and the operation repeated.

It will be obvious that a very simple and effective hand-press has been described and that it can be efficiently used to produce various kinds of molded articles without the employment of laborers having a high degree of skill.

If it is desired to make articles of a similar shape to the one illustrated, but having small modifications, it will be obvious to a person skilled in this art that such articles can be readily molded by making certain obvious substitutions of mold parts and cores. For molding an ash-pan block, with the usual ash-hole, the pallet would be straight on top, with the part 37 removed and with a block attached in the center of the block 38 to constitute a core for the hole. For chimney-blocks having thimble-holes a similar proceeding will be had, except that the holes will be made one-half in the end of each block, the end being reversible. The upper block is provided with a flange on the inside, and therefore the core for this kind of a block will have a larger opening in its side, the outside being the same as before. The core for the thimble-hole is attached to the pallet between the smoke-chamber and the air-chamber cores and also between the outside casing and the air-chamber core, so as to afford an opening through both walls to the interior to provide for ventilation. In order to provide for openings of this character on both sides of the ventilating-block, these cores may be attached to the press-head in the reverse position to that which they occupy on the pallet. The ash-pan-hole cores can also be set up in the same way.

Having thus described my invention, I claim as new and desire to secure by Letters Patent—

1. A molding-machine comprising a stationary mold-bottom having a perforation therethrough, a pair of levers pivotally mounted with respect to said mold-bottom and each having a slot, a core-plate provided with a stud on each side, each stud entering one of said slots.

2. A molding-machine comprising a core-plate, cores thereon, pivoted levers for operating the core-plate a catch for locking the levers in position to hold said core-plate in elevated position, means for disengaging the catch from the core-plate, and a mold mounted above said core-plate.

3. A molding-machine comprising a core-plate, cores thereon, a pair of pivoted levers to which the core-plate is pivoted, a locking device for locking the levers in position to hold the core-plate elevated, and a mold-box above the core-plate and having openings in its bottom corresponding in size and shape to the cores.

4. A molding-machine, comprising a table having openings in its top, a mold-box on the table-top, a pallet on the table-top within the mold-box and provided with openings corresponding to the openings of the table-top, a core-plate below the table-top and provided with a plurality of cores projecting through the openings of the table-top and pallet, means for operating the core-plate, a frame hinged to one wall of the mold-box and having its free end detachably secured to the table-top, a press-plate frame adjustably carried by the said frame, and a press-plate carried thereby and corresponding in shape to the pallet but being the negative thereof.

5. A molding-machine, comprising a table having openings in its top, a mold-box on the table-top, a pallet on the table-top within the mold-box and provided with openings corresponding to the openings in the table-top, a core-plate below the table-top and provided with a plurality of cores projecting through the openings of the table-top and pallet, means for operating the core-plate, a hinged frame extending over the mold-box, a press-plate frame, a screw secured to the press-plate frame and working in the hinged frame, and a press-plate carried by the said frame, said press-plate corresponding in shape to the pallet but being the negative thereof.

6. A molding-machine, comprising a table having a plurality of openings in its top, a mold-box on the table, one side of the mold-box being fixedly secured to the table-top, a pallet on the table-top within the mold-box and provided with openings corresponding to the openings in the table-top, core-plate below the table-top and provided with a plurality of cores projecting through the openings of the table-top and pallet, means for operating the core-plate, a frame hinged to the fixed side of the mold-box extending over the mold-box and having its free end in locking engagement with the table-top, a press-plate frame, a press-plate carried by the said frame, said press-plate corresponding in shape to the pallet but being the negative thereof, and means for adjustably supporting the press-plate frame from the hinged frame.

7. In a molding-machine, the combination of a table having a guide upon its lower surface and a plurality of perforations in its top, said top constituting the bottom of the mold, a core-plate located below the top of the table and adapted to move in said guides, said core-plate being provided with a plurality of cores, pivoted levers with which the core-plate is connected for moving the core-plate toward and from the top of the table from below, and means for locking the lever in position to hold the core-plate in elevated position.

8. In a molding-machine, the combination of a table having a guide upon its lower surface and a plurality of perforations in its top, said top constituting the bottom of the mold, a core-plate located below the top of the table and adapted to move in said guides, said core-plate being provided with a plurality of cores, pivoted levers to which the core-plate is pivoted for moving the core-plate toward and from the table, means for locking the levers in position to hold the core-plate in elevated position, a pallet located on the top of the table and having perforations corresponding to the shape of the cores, a standard on the table, a series of walls movably mounted on the standard and constituting the main part of the mold, a frame pivoted to the standard, and a press-plate mounted on the frame.

In testimony whereof I have signed my name to this specification in the presence of two subscribing witnesses.

HENRY BANNON.

Witnesses:
FRANK AREHART,
G. R. OSTERWALD.